Feb. 23, 1937. B. B. DOWNING 2,072,031
WHEELED GARDENING IMPLEMENT
Original Filed Jan. 7, 1935
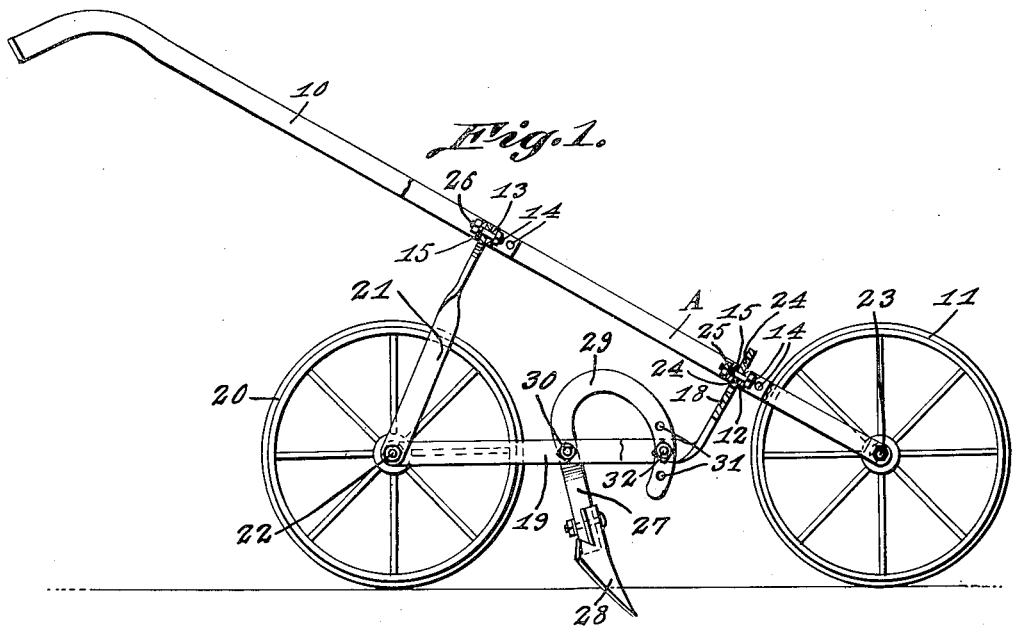
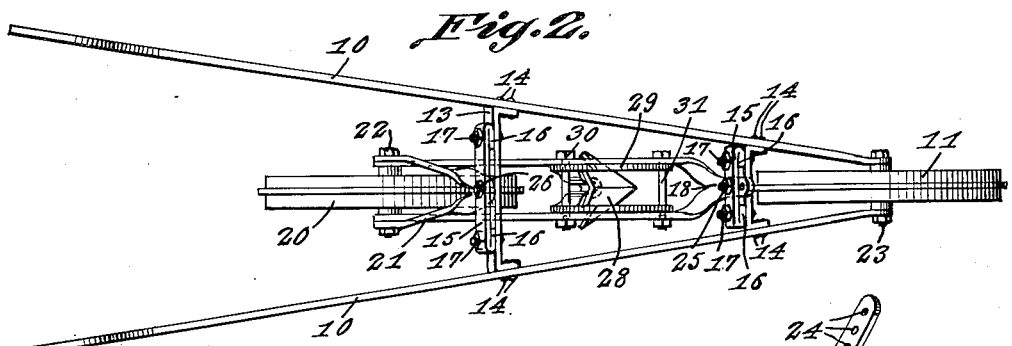
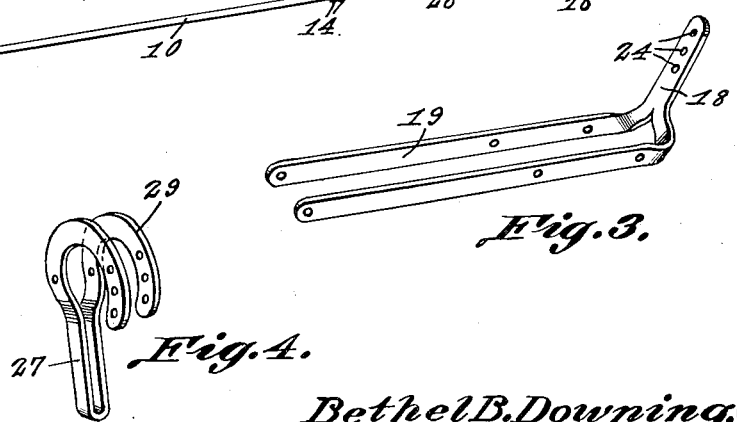
Bethel B. Downing, INVENTOR
BY Victor J. Evans & Co.
ATTORNEY Patented Feb. 23, 1937

2,072,031

UNITED STATES PATENT OFFICE 2,072,031

WHEELED GARDENING IMPLEMENT

Bethel B. Downing, Mayo, Fla.

Application January 7, 1935, Serial No. 773
Renewed August 13, 1936

1 Claim. (Cl. 97—59)

The invention relates to a wheeled gardening implement and more especially to a wheeled hand plow.

The primary object of the invention is the provision of an implement of this character, wherein the soil in a garden can be worked, as for example, the plowing thereof, as the implement is hand operated to advance the same and the ground working part is susceptible of adjustment to give the proper pitch and depth of cut thereto.

Another object of the invention is the provision of an implement of this character which is simple in construction, light in weight, yet strong, durable, thoroughly reliable and effective in its operation, readily and easily adjusted, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a side elevation partly in section of a gardening implement constructed in accordance with the invention.

Figure 2 is a top plan view thereof.

Figure 3 is a perspective view of the rear wheel fork.

Figure 4 is a perspective view of the plowshare standard or stock.

Similar reference characters indicate corresponding parts throughout the several views in the drawing.

Referring to the drawing in detail, the gardening implement comprises a frame A including forwardly inclined converging handle bars 10, these at their forward ends constituting the fork for a front wheel 11 and being joined together by the cross connecting pieces or bars 12 and 13, one being arranged in advance and joined to the handle bars by the fasteners 14. Supported upon the cross pieces 12 and 13 are the yoke pieces 15, these having the downwardly and inwardly turned ends 16 through which are passed fasteners 17 connecting the same to the parts 12 and 13, respectively.

Inserted in the yoke piece 15 on the forward cross piece 12 is the hanger extension 18 of a front fork 19 for the rear ground wheel 20, while passed through the yoke piece 15 on the rear cross piece 13 is the rear fork 21 for said rear wheel 20. These forks meet each other and receive the axle 22 for said rear wheel 20, while the axle 23 for the front wheel 11 is journaled in the forward fork end of the handle bars 10.

The hanger extension 18 has provided therein a series of holes 24 for selectively receiving an attaching bolt 25 mounted centrally of the piece 12 and the yoke 15. The rear fork 21 is connected centrally between the piece 13 and the yoke 15 thereon by an attaching bolt 26.

Supported upon the front fork 19 is the standard or stock 27 for the plowshare 28 and this standard or stock 27 has the upwardly, forwardly and downwardly curved double arms 29, swingingly supported by pivot members 30 mounted in the front fork 19. The arms 29 are provided with spaced holes 31 selectively engaged by fasteners 32 carried in the front fork 19 and thus it will be seen that the pitch of the plowshare 28 can be determined, while on adjustment of the front fork 19 the depth of cutting action of such share may be had.

The implement is pushed by hand and the wheels 11 and 20 travel upon the ground surface so that the plowing operation can be carried forth. In lieu of the plowshare and its standard or stock, other ground working elements or units may be attached to the front fork 19, as for example, for cultivating purposes or for weeding, the implement being strictly a garden tool and hand operated.

What is claimed is:

A wheeled hand implement comprising a pair of forwardly inclined converging hand bars, cross pieces between the bars in spaced front and rear relation to each other, yokes supported by the pieces, a fork member fitted for support between each cross piece and its cooperating yoke, the front fork having means to provide an adjustable connection, a wheel journaled between the converged ends of the handle bars, an axle connecting the free ends of the yokes and upon which is journaled a second wheel, and a ground working tool standard having two-point connection with the front fork, one of the connections for the standard permitting angular adjustment thereof.

BETHEL B. DOWNING.